United States Patent
Hamilton et al.

(10) Patent No.: US 10,102,755 B1
(45) Date of Patent: Oct. 16, 2018

(54) METHOD AND SYSTEM FOR AIRCRAFT POSITIONING—AUTOMATED TRACKING USING ONBOARD GLOBAL VOICE AND HIGH-SPEED DATA

(71) Applicant: Satcom Direct, Inc., Satellite Beach, FL (US)

(72) Inventors: Darryl Scott Hamilton, Cle Elum, WA (US); David R. Morgan, Satellite Beach, FL (US); James Jensen, Satellite Beach, FL (US)

(73) Assignee: Satcom Direct, Inc., Satellite Beach, FL (US)

( * ) Notice: Subject to any disclaimer, the term of this patent is extended or adjusted under 35 U.S.C. 154(b) by 578 days.

(21) Appl. No.: 14/478,551

(22) Filed: Sep. 5, 2014

Related U.S. Application Data

(60) Provisional application No. 61/994,526, filed on May 16, 2014, provisional application No. 61/892,136, filed on Oct. 7, 2013.

(51) Int. Cl.
  *G08G 5/00* (2006.01)
(52) U.S. Cl.
  CPC .................................. *G08G 5/0013* (2013.01)
(58) Field of Classification Search
  CPC ..................................................... G08G 5/0013
  See application file for complete search history.

(56) References Cited

U.S. PATENT DOCUMENTS

| | | | |
|---|---|---|---|
| 4,037,905 A | 7/1977 | Lucas | |
| 5,493,309 A | 2/1996 | Bjornholt | |
| 5,937,349 A | 8/1999 | Andresen | |
| 5,959,560 A | 9/1999 | Said | |
| 6,014,606 A | 1/2000 | Tu | |
| 6,058,307 A * | 5/2000 | Garner | H04B 7/18539 455/12.1 |
| 6,151,497 A | 11/2000 | Yee | |
| 6,201,797 B1 | 3/2001 | Leuca | |
| 6,400,945 B1 | 6/2002 | Jensen et al. | |

(Continued)

FOREIGN PATENT DOCUMENTS

| | | |
|---|---|---|
| WO | 2007134498 | 11/2007 |
| WO | 2008139062 | 11/2008 |
| WO | 2009097042 | 8/2009 |

OTHER PUBLICATIONS

Brodkin, "Satellite Internet: 15Mbps, no matter where you live in the US", Jan. 7, 2013, Ars Technica.*

(Continued)

*Primary Examiner* — Courtney D Heinle

(74) *Attorney, Agent, or Firm* — Katten Muchin Rosenman LLP

(57) ABSTRACT

Methods, systems and devices for real position reports between an aircraft and a terrestrial network using Swift-Broadband and a set of calculation instructions which identifies the specific aircraft and calculates multiple variables including, but not limited to, Speed, Heading, Departure Airport, and Arrival Airport. Once all variables have been calculated the system tracks the aircraft status on a map for multiple platforms. The position tracking system generates position reports that can be integrated into combined mapping system of other source data to give the most accurate position data possible.

16 Claims, 2 Drawing Sheets

(56) References Cited

U.S. PATENT DOCUMENTS

| | | | |
|---|---|---|---|
| 6,529,820 B2 | 3/2003 | Tomescu | |
| 6,732,027 B2 * | 5/2004 | Betters | G01C 23/005 |
| | | | 701/29.4 |
| 6,741,841 B1 | 5/2004 | Mitchell | |
| 6,781,968 B1 | 8/2004 | Colella | |
| 6,892,069 B1 | 5/2005 | Flynn | |
| 6,952,645 B1 * | 10/2005 | Jones | G07C 5/008 |
| | | | 340/989 |
| 6,954,794 B2 | 10/2005 | Rudd et al. | |
| 6,970,704 B2 | 11/2005 | Jensen et al. | |
| 6,978,128 B1 | 12/2005 | Raman | |
| 7,023,365 B1 | 4/2006 | Mitchell | |
| 7,027,898 B1 | 4/2006 | Leger et al. | |
| 7,177,939 B2 | 2/2007 | Nelson et al. | |
| 7,209,978 B2 | 4/2007 | Thubert et al. | |
| 7,436,762 B2 | 10/2008 | Oka et al. | |
| 7,660,579 B2 | 2/2010 | Jensen | |
| 7,668,632 B2 | 2/2010 | Vian et al. | |
| 7,739,167 B2 | 6/2010 | Breen et al. | |
| 7,761,793 B1 | 7/2010 | Mitchell | |
| 7,852,819 B2 | 12/2010 | Gil | |
| 7,908,077 B2 | 3/2011 | Smith et al. | |
| 8,305,936 B2 | 11/2012 | Wang | |
| 8,339,991 B2 | 12/2012 | Biswas | |
| 8,369,812 B2 | 2/2013 | Lehman | |
| 8,432,808 B1 | 4/2013 | Dankberg et al. | |
| 8,477,771 B2 | 7/2013 | Biswas | |
| 8,527,662 B2 | 9/2013 | Biswas | |
| 8,594,931 B2 | 11/2013 | Sterkel et al. | |
| 8,762,047 B2 | 6/2014 | Sterkel et al. | |
| 9,008,868 B1 | 4/2015 | Bantoft et al. | |
| 9,318,024 B1 | 4/2016 | Natwick et al. | |
| 9,412,278 B1 * | 8/2016 | Gong | H04L 63/101 |
| 9,553,658 B1 | 1/2017 | Bantoft et al. | |
| 9,554,275 B1 | 1/2017 | Bantoft et al. | |
| 9,565,618 B1 | 2/2017 | Bantoft et al. | |
| 9,577,742 B1 | 2/2017 | Bantoft | |
| 2003/0055975 A1 | 3/2003 | Nelson et al. | |
| 2003/0093187 A1 | 5/2003 | Walker | |
| 2003/0123481 A1 | 7/2003 | Neale et al. | |
| 2003/0130771 A1 * | 7/2003 | Crank | B64D 45/0015 |
| | | | 701/4 |
| 2003/0225492 A1 * | 12/2003 | Cope | G07C 5/008 |
| | | | 701/33.4 |
| 2004/0064588 A1 | 4/2004 | Jungck | |
| 2005/0041859 A1 | 2/2005 | Nguyen | |
| 2005/0053026 A1 | 3/2005 | Mullan et al. | |
| 2005/0083358 A1 | 4/2005 | Lapstun | |
| 2005/0090978 A1 * | 4/2005 | Bathory | G08G 5/0013 |
| | | | 701/469 |
| 2005/0148327 A1 * | 7/2005 | Perez | H04L 41/069 |
| | | | 455/431 |
| 2005/0177647 A1 | 8/2005 | Anantha et al. | |
| 2005/0187677 A1 | 8/2005 | Walker | |
| 2005/0215238 A1 | 9/2005 | Macaluso | |
| 2005/0215249 A1 | 9/2005 | Little | |
| 2005/0220055 A1 | 10/2005 | Nelson et al. | |
| 2005/0244060 A1 | 11/2005 | Nagarajan | |
| 2006/0013264 A1 | 1/2006 | Eichler et al. | |
| 2006/0092897 A1 | 5/2006 | Pirila et al. | |
| 2006/0112119 A1 * | 5/2006 | Vian | G07C 5/085 |
| 2006/0115164 A1 | 6/2006 | Cooley | |
| 2006/0154660 A1 * | 7/2006 | Waugh | H04B 7/18508 |
| | | | 455/428 |
| 2006/0156357 A1 | 7/2006 | Lockridge et al. | |
| 2006/0293049 A1 * | 12/2006 | Jensen | H04B 7/18502 |
| | | | 455/431 |
| 2007/0123290 A1 | 5/2007 | Stenmark | |
| 2008/0036659 A1 * | 2/2008 | Smith | G01S 13/765 |
| | | | 342/454 |
| 2008/0182573 A1 | 7/2008 | Lauer et al. | |
| 2009/0023403 A1 | 1/2009 | Laberge | |
| 2009/0109849 A1 | 4/2009 | Wood et al. | |
| 2009/0239475 A1 | 9/2009 | Lehman | |
| 2009/0304096 A1 | 12/2009 | Khattab et al. | |
| 2010/0027461 A1 | 2/2010 | Bothorel | |
| 2010/0035607 A1 | 2/2010 | Horr et al. | |
| 2010/0167723 A1 | 7/2010 | Soumier et al. | |
| 2010/0217458 A1 | 8/2010 | Schweiger et al. | |
| 2010/0279698 A1 | 11/2010 | Wong | |
| 2011/0046842 A1 | 2/2011 | Smith | |
| 2011/0046920 A1 | 2/2011 | Amis | |
| 2011/0063980 A1 | 3/2011 | Kondo | |
| 2011/0114726 A1 | 5/2011 | Porter et al. | |
| 2011/0149849 A1 | 6/2011 | Brownrig | |
| 2011/0255506 A1 | 10/2011 | Toth et al. | |
| 2012/0033851 A1 | 2/2012 | Chen et al. | |
| 2012/0083971 A1 | 4/2012 | Preston | |
| 2012/0109447 A1 | 5/2012 | Yousefi et al. | |
| 2012/0166576 A1 | 6/2012 | Orsini et al. | |
| 2012/0232782 A1 | 9/2012 | Sterkel et al. | |
| 2012/0232791 A1 | 9/2012 | Sterkel et al. | |
| 2012/0303826 A1 * | 11/2012 | Nelson | H04B 7/18506 |
| | | | 709/228 |
| 2013/0103786 A1 | 4/2013 | Miglore | |
| 2013/0120166 A1 | 5/2013 | Kommuri et al. | |
| 2013/0158821 A1 | 6/2013 | Ricci | |
| 2013/0219429 A1 | 8/2013 | Hirsch et al. | |
| 2013/0235728 A1 | 9/2013 | Le et al. | |
| 2013/0283305 A1 | 10/2013 | Hirsch et al. | |
| 2013/0297103 A1 | 11/2013 | Baker et al. | |
| 2014/0024395 A1 | 1/2014 | Johnson et al. | |
| 2014/0045420 A1 | 2/2014 | Tong et al. | |
| 2014/0045520 A1 | 2/2014 | Lim et al. | |
| 2014/0053243 A1 | 2/2014 | Walsh et al. | |
| 2014/0081483 A1 | 3/2014 | Weinmann et al. | |
| 2014/0136658 A1 * | 5/2014 | Wahler | H04B 7/18508 |
| | | | 709/218 |
| 2014/0137162 A1 | 5/2014 | McNamee et al. | |
| 2014/0248588 A1 | 9/2014 | Williams et al. | |
| 2014/0282038 A1 | 9/2014 | Royster et al. | |
| 2014/0315166 A1 | 10/2014 | Williams et al. | |
| 2015/0058184 A1 * | 2/2015 | Clark | G06Q 40/12 |
| | | | 705/30 |
| 2015/0243112 A1 | 8/2015 | Jensen et al. | |
| 2016/0086396 A1 * | 3/2016 | Nutaro | G07C 5/0808 |
| | | | 701/29.4 |
| 2016/0093217 A1 * | 3/2016 | Hale | G08G 5/0026 |
| | | | 701/120 |
| 2016/0156448 A1 * | 6/2016 | Gadat | H04B 7/18508 |
| | | | 370/315 |
| 2017/0011615 A1 * | 1/2017 | Bekanich | G08B 25/006 |

OTHER PUBLICATIONS

Marpe, et al, A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

Linux man page, gzip, gunzip, zcat—compress or expand files, 2002, 7 pages.

Rockwell Collins, EBACE 2012 Press Kit, retrieved on Oct. 4, 2013, retrieved from http://www.rockwellcollins.com/sitecore/content/Data/News/2012_2012_Yr/CS/FY12CSN . . . , 2 pages.

Vandel, et al., Head-Up Guidance System Technology—A Clear Path to Increasing Flight Safety, Flight Safety Foundation, 2009, 29 pages.

Rockwell Collins, Ascent Mobile Applications, 2012, 2 pages.

Rockwell Collins, Falcon Cabin HD, Elevate your flight experience, 2012, 12 pages.

Rockwell Collins, Pro Line Fusion Advanced Avionics, 2011, 8 pages.

Rockwell Collins, Venue High-Definition Cabin Management System, 2012, 12 pages.

Rockwell Collins, Rockwell Collins to provide advanced cabin management and HD entertainment system for Falcon 7X and Falcon 900LX, News Release, 2012, 1 page.

Rockwell Collins, Jet Aviation St. Louis to install Rockwell Collins' Venue HD cabin system on a Global Express, News Release, 2012, 2 pages.

(56) References Cited

OTHER PUBLICATIONS

Rockwell Collins, Airshow 4000, retrieved on Oct. 4, 2013, retrieved from http://www.rockwellcollins.com/sirecore/content/Data/Products/Cabin/Moving_Map_syst . . . , 2 pages.
Rockwell Collins, Airshow App for Mobile Devices, 2012, 4 pages.
Rockwell Collins, Airshow 4000 Version 2, 2013, 9 pages.

* cited by examiner

METHOD AND SYSTEM FOR AIRCRAFT POSITIONING—AUTOMATED TRACKING USING ONBOARD GLOBAL VOICE AND HIGH-SPEED DATA

CROSS REFERENCE TO RELATED APPLICATIONS

This application claims the benefit of priority to U.S. Provisional Patent Application No. 61/994,526 filed May 16, 2014 and U.S. Provisional Patent Application No. 61/892,136 filed on Oct. 7, 2013. The entire disclosure of each the applications listed in this paragraph are incorporated herein by specific reference thereto.

FIELD OF THE INVENTION

This invention relates to aircraft location tracking and, in particular, to methods, systems and devices for an automated aircraft position reporting subsystem using flight related aircraft position data from multiple sources including Swift-Broadband to automatically track the identified aircraft anywhere in the world without the necessity for human intervention.

BACKGROUND AND PRIOR ART

There are a few known ways to track aircraft in industry today. All of these mechanisms integrate with United States government supplied data or other source data. Prior art systems only provide location information about the aircraft based on data from publically available sources. Prior art subsystems are only as good as its supplied source and limited at best.

What is needed is a position reporting subsystem using SwiftBroadband on an aircraft anywhere in the world without the necessity for human intervention. Further, position reports should be integrated into combined mapping system of other source data to give the most accurate position data possible.

SUMMARY OF THE INVENTION

A primary objective of the present invention is to provide methods, systems and devices for a position reporting subsystem using SwiftBroadband on an aircraft anywhere in the world without the necessity for human intervention.

A secondary objective of the present invention is to provide methods, systems and devices for real position reports between an aircraft and a terrestrial network using SwiftBroadband.

A third objective of the present invention is to provide methods, systems and devices for real position reports using data from SwiftBroadband in combination with other position data to accurately display the updated position of the aircraft.

A fourth objective of the present invention is to provide methods, systems and devices for real position reports using data from SwiftBroadband or any other satellite system to allow aircraft operators the ability to track their aircraft worldwide and to ensure that the operator knows the aircraft status at all times by using SwiftBroadband position reports that are available worldwide and is updated approximately every two minutes.

A fifth objective of the present invention provides methods and systems for generating aircraft position reports and global mapping based on data from Inmarsat, from government aviation agencies and from available avionics equipment onboard the aircraft to provide the most comprehensive flight tracking service available.

A sixth objective of the present invention provides methods and systems for generating aircraft position reports and providing global mapping including using Google Maps which provides advanced mapping capabilities including street level maps which are useful for helicopter tracking.

A seventh objective of the present invention provides methods and systems for advanced mapping to provide network overlays, planned and actual flight routes, and aircraft satcom status for complete situational awareness for dispatchers and maintenance personnel.

An eighth objective of the present invention provides methods and systems for generating aircraft position reports and providing global mapping for customer use using a fast and intuitive interface to access the information on any mobile device.

A first embodiment provides an aircraft positioning and automated real time aircraft tracking system using global voice and high-speed data that includes an aircraft communication system for transmitting an aircraft position data and an aircraft identification, a satellite constellation for receiving the transmitted position data and aircraft identification and retransmitting the position data and aircraft identification, and a ground network to receive the transmitted aircraft position and aircraft identification and receive third party aircraft data corresponding to the aircraft identification and calculating real time positional data corresponding to the aircraft identification. The ground network can include a transceiver for receiving real time aircraft flight information from the third party source, a lookup table for matching the received aircraft identification with a subscribing aircraft data, and a processing device for executing a set of instructions for matching the received aircraft identification with the subscribing aircraft data, processing the real-time flight information corresponding to the aircraft identification and calculating real time positional data. The satellite constellation can be the Inmarsat I4 Satellite constellation using SwiftBroadband.

The real time flight information can include aircraft speed, aircraft heading, aircraft departure airport and aircraft arrival airport. The third party real time aircraft flight information can be received from U.S. Federal Aviation Administration FAA, the Canadian aviation authority NAV CANADA, SwiftBroadband data, and actual realtime flight data transmitted from an onboard aircraft avionics module. The onboard aircraft avionics module can be a Satcom Direct FlightDeck Freedom module.

The set of instructions can include a sub set of tracking instructions for tracking the identified aircraft status on a map and generating a position report corresponding to the identified aircraft. The automatic aircraft tracking system can be integrated into Satcom Direct service offerings including AERO V voice over Internet protocol for aviation, Flight Tracker to provide global flight tracking, and a satellite-ready Satcom Direct router with simultaneous use of one or more of Inmarsat Classic Aero, Inmarsat Swift-Broadband, Inmarsat Swift 64, Iridium, Ku-Band and Ka-Band satellite connections.

A second embodiment provides a method for aircraft positioning and automated real time aircraft tracking using global voice and high-speed data by establishing a communication link between an aircraft and a satellite constellation, transmitting an aircraft position data and aircraft identifier to a ground based network, comparing the aircraft identifier with a database of subscribing aircraft identifications at the ground based station, discarding the received data when no aircraft identification match is found, locating the aircraft corresponding to the aircraft identifier when a match is found, and recording position data. The method can include automatically receiving flight related data corresponding to the identified aircraft via SwiftBroadband at the ground based station, combining the received position data from the aircraft with the SwiftBroadband flight related data, generating an aircraft position report, calculating a departure airport, arrival airport, aircraft speed, and aircraft heading from the combined flight related data.

The method claim include automatically mapping the aircraft position using the aircraft position report and or determining a priority of the SwiftBroadband flight related data and using the SwiftBroadband flight related data based on the priority.

Receiving SwiftBroadband flight related data can include receiving flight related data from government sources including GPS, U.S. Federal Aviation Authority FAA and Canadian aviation authority NAV CANADA and or communicating with avionics equipment on-board the identified aircraft to collect the aircraft position data.

Establishing a communication link can include establishing communication with the ground based system simultaneously using one or more of SwiftBroadband, Swift 64, Ku-Band, and Ka-Band satellite connections.

The automated real time aircraft tracking can be integrated into one or more Satcom Direct service offerings including FlightDeck Freedom, AERO V voice over Internet protocol for aviation, Flight Tracker to provide global flight tracking, and a satellite-ready Satcom Direct router with simultaneous use of one or more of Inmarsat Classic Aero, Inmarsat SwiftBroadband, Inmarsat Swift 64, Iridium, Ku-Band and Ka-Band satellite connections.

The automated real time aircraft tracking can be integrated with a mobile application downloadable to a mobile communication device for tracking the identified aircraft position on a moving map.

Further objects and advantages of this invention will be apparent from the following detailed description of preferred embodiments which are illustrated schematically in the accompanying drawings.

DESCRIPTION OF THE PREFERRED EMBODIMENTS

Figure 1:
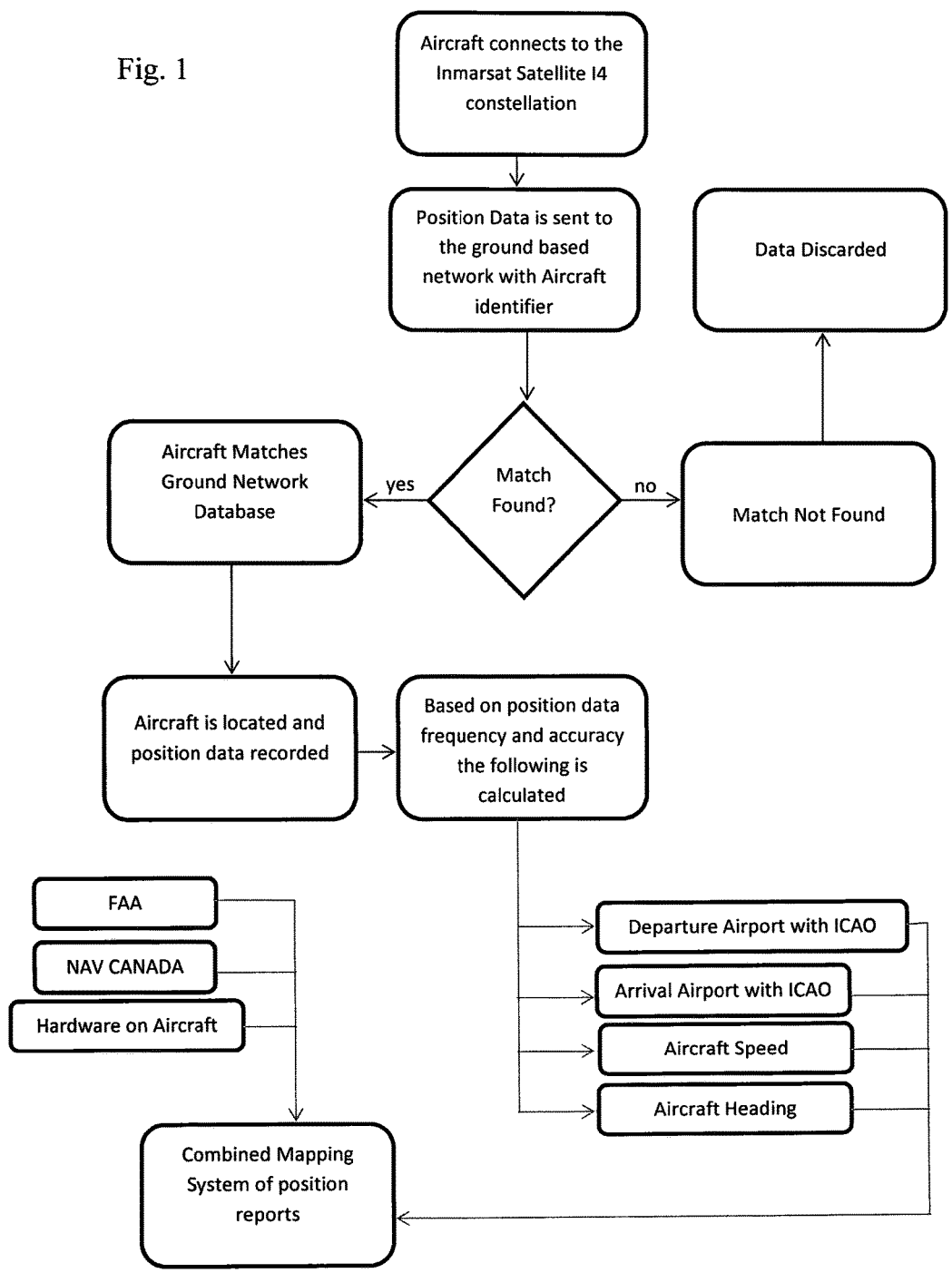
FIG. 1 is a flow diagram showing the process for receiving aircraft data and automated tracking using SwiftBroadband data.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The aircraft positioning and automated tracking using global voice and high-speed data, such as SwiftBroadband data, is an embedded technology for use in conjunction with Satcom Direct service offerings such as, but not limited to, AERO V® (Satcom Direct's voice over Internet Protocol for aviation), Satcom Direct Flight Tracker which provides global flight tracking, SkyTicket (to bill selected passengers for data consumed in-flight), SkyShield (Satcom Direct's SkyShield allows a user to control in-flight Internet usage by blocking unneeded processes that slow down connection and increase data costs) and AERO XR® for data acceleration, compression and optimization.

The aircraft positioning and automated tracking using global voice and high-speed data such as SwiftBroadband data and the like can be integrated with various products described in U.S. Patent Applications, each assigned to Satcom Direct, Inc. the same assignee as this patent application, which are all incorporated by reference in their entirety:

U.S. patent application Ser. No. 14/259,796 filed on Apr. 23, 2014, now U.S. Pat. No. 9,577,742, by the same assignee of the subject invention, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the onboard system and ground system that supports communications to and from an airborne terminal.

U.S. patent application Ser. No. 14/297,146 filed on Jun. 5, 2014, now U.S. Pat. No. 9,008,868, which claims the benefit of priority to U.S. Provisional Patent Application No. 61/888,574 filed on Oct. 9, 2013, by the same assignee of the subject invention, describes methods and systems for use of a centrally managed, 'Cloud' based system that is responsible for management of onboard avionics equipment. Specifically, this invention relates to a system whereby an avionics device will communicate with a centrally located 'Cloud' system for command and control of both predefined and arbitrary tasks or functions that the onboard avionics will perform.

U.S. patent application Ser. No. 14/317,173 filed June 27.2014, now U.S. Pat. No. 9,565,618, which claims the benefit of priority to U.S. Provisional Patent Application No. 61/888,593 filed Oct. 9, 2013, by the same assignee of the subject invention, describes methods and systems that can manage multiple different connection types for Air-to-Ground and Ground-to-Air communications. This system actively monitors the different connections types, and switches traffic to the highest priority functioning connection. Furthermore, it does this while maintaining the connections of Internet TCP/IP traffic that is passing through the system, allowing passenger or system traffic to remain connected.

U.S. Provisional Patent Application No. 61/888,600 filed Oct. 9, 2013, by the same inventor and assignee of the subject invention, describes a capability which requires aircraft passengers who wish to use Internet Access while onboard an aircraft to watch a mandatory safety briefing video prior to being granted Internet access. During the use of personal electronic devices PED onboard an aircraft, the PEDS connect to an onboard wireless access point (Wi-Fi). Either through onboard avionics equipment, or through a centrally managed ground based infrastructure, the passenger is required to watch a safety briefing video, with our without additional commercial or educational messages, before the PED is allowed access to the Internet. This is similar to many 'Wi-Fi Hotspots' whereby the owner/operations of such require the viewing of advertisement or other communication content prior to being granted Internet access.

U.S. application Ser. No. 14/259,588 filed on Apr. 23, 2014, now U.S. Pat. No. 9,553,658, which claims the benefit of priority to U.S. Provisional Patent Application 61/892,672 filed Oct. 18, 2013. U.S. Provisional Patent Application 61/888,574 filed Oct. 9, 2013. U.S. Provisional Patent Application 61/888,593 filed Oct. 9, 2013. U.S. Provisional Patent Application 61/889,183 filed Oct. 10, 2013, by the same assignee of the subject invention, describes a satellite-ready Satcom Direct router with simultaneous use of one or more of Inmarsat SwiftBroadband, Inmarsat Swift 64, Ku-Band and Ka-Band satellite connections with intelligent traffic control, along with Wi-Fi access and 3G/4G cellular network connectivity. The router is compatible with existing Wi-Fi access points and is backward-compatible with 802.11b/g. Up to four or more simultaneous wireless networks can be supported, allowing multiple systems to operate on aircraft without additional wireless access points and providing 3G/4G network connectivity when the aircraft is on the ground. A downloadable Satcom Direct router mobile App provides on-board cabin services including one or more of moving maps, flight tracker and command and control of satellite links.

SwiftBroadband is an IP-based packet-switched communications network that provides a symmetric 'always-on' data connection of up to 432 kbit/s per channel for aircraft globally except for the polar regions, using the Inmarsat satellite constellation.

The present invention provides methods, systems and devices for real position reports using data from SwiftBroadband or any other satellite system to allow aircraft operator the ability to track their aircraft worldwide and to ensure that the operator knows the aircraft status at all times by using SwiftBroadband position reports that are available worldwide and is updated approximately every two minutes. The methods and systems generate aircraft position reports and global maps based on data from Inmarsat, from government aviation agencies and from available avionics equipment onboard the aircraft to provide the most comprehensive flight tracking service available.

Specifically, the invention relates to a specific calculation which identifies the specific aircraft and calculates multiple variables including, but not limited to, speed, heading, departure airport, and arrival airport. Once all variables have been calculated the system tracks the aircraft status on a map for multiple platforms. The position tracking system generates position reports that can be integrated into combined mapping systems of other source data to provide the most accurate position data possible.

The aircraft automated tracking methods and systems generate aircraft position reports and provide global mapping including using Google Maps which provides advanced mapping capabilities including street level maps which are useful for helicopter tracking. The advanced mapping can include network overlays, planned and actual flight routes, and aircraft satcom status for complete situational awareness for dispatchers and maintenance personnel.

In a preferred embodiment, the methods and systems generate aircraft position reports and provide global mapping for customer use using a fast and intuitive interface to access the information on any mobile device.

FIG. 1 is a flow diagram showing the process for receiving aircraft data and automated tracking using SwiftBroadBand data. When the system connects to the satellite constellation the source position data is sent to a ground based flight tracking system connected to a hosted ground network. The aircraft position data and aircraft identifier is then sent to the ground network for a match of the aircraft. When a match is not found, the received data is discarded. When the aircraft identifier matches an aircraft in the ground network database, the aircraft is located and the aircraft position data is recorded.

After the aircraft identity is matched, the ground based flight tracking system automatically calculates flight data including, but not limited to, departure airport, arrival airport, aircraft speed and aircraft heading. The calculations are based on position data frequency and accuracy. Once all of these calculations are completed, the information is accurately and automatically sent to a ground based mapping solution where it is integrated with other sources of position data. In the example shown, the calculated departure and arrival airports, aircraft speed and aircraft heading can be combined with position data from other sources such as the U. S. Federal Aviation Authority, the Canadian aviation authority NAV CANADA, and/or position data received from avionics modules onboard the identified aircraft.

Figure 2:
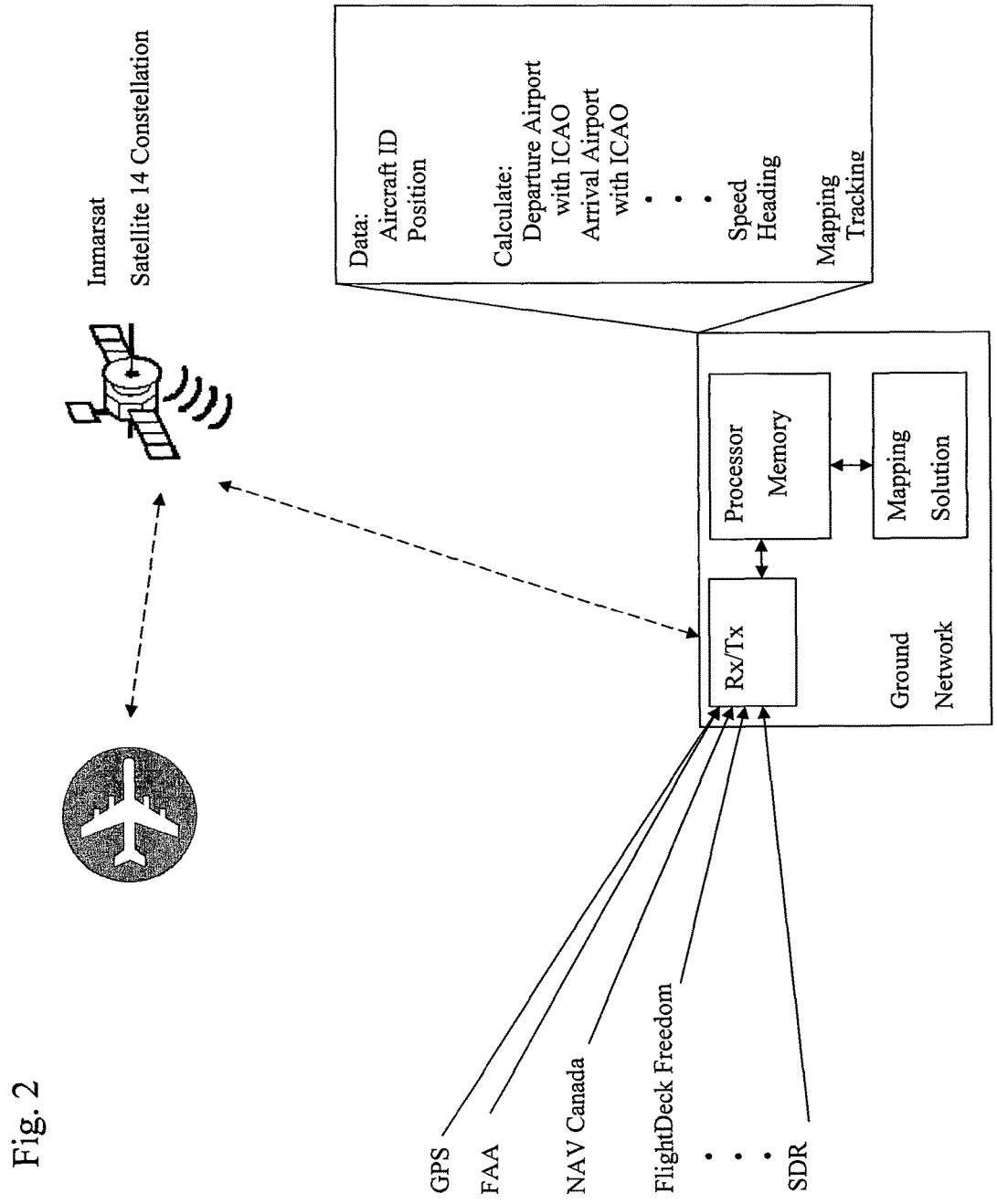
FIG. 2 is a block diagram of aircraft positioning and automated tracking using global voice and high-speed data according to the present invention.

FIG. 2 is a block diagram of aircraft positioning and automated tracking using global voice and high-speed data, such as SwiftBroadband data and the like, onboard an aircraft anywhere in the world without the necessity for human intervention. As shown, the system of the present invention provides a completely new capability to track an aircraft using SwiftBroadband and calculating variables including but not limited to aircraft position, speed, heading, departure airport, and arrival airport. The system includes a software system implemented to enable efficient and accurate communications between an aircraft and the ground station, through the use of an internet connection.

As shown, the system is provided by a host via a ground station network that can be in communication with the aircraft equipment and or can communicate with the aircraft via the on-board internet. At the ground station, the ground network receives flight related data from sources such as the FAA and NAV CANADA. When available, additional information can be supplied from specific aircraft modules such as FlightDeck Freedom® (FDF). Table 1 provides an example of the information available from different third party sources and from aircraft aviation modules.

TABLE 1

| Position Source | Speed | Altitude | Status | Distance | Flight Plan Path | Actual Plan Path |
|---|---|---|---|---|---|---|
| FAA | X | X | X | X | X | X |
| NAV Canada | X | X | X | X | X | X |
| FlightDeck Freedom | X | X | X | X | X | X |

When information is available from specific aircraft modules or more than one third party source, the ground network processor uses priority based information. For example, the FAA information can be time delayed, thus if the same information is available from another source, the other source can be given priority. Position reports can be integrated into combined mapping system of other source data to give the most accurate position data possible. For example, the automated tracking methods and systems can provide global mapping including using Google Maps which provides advanced mapping capabilities including street level maps which are useful for helicopter tracking. The advanced mapping can include network overlays, planned and actual flight routes, and aircraft satcom status for complete situational awareness for dispatchers and maintenance personnel.

An embodiment provides a mobile app for accessing the automated global tracking to allow the user to access the aircraft position reports and global mapping using a fast and intuitive interface on any mobile device.

Additional details, objects, advantages will become apparent with reference to the illustrations and drawings offered to disclose the significant features, structures and mechanisms of the present invention. The drawings are presented herein to provide a depiction of the significant features of the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An aircraft positioning and automated real time aircraft tracking system for providing an "always on" automatic real time tracking of the aircraft anywhere at all times, comprising:
   an aircraft communication system on an aircraft for transmitting position data of an on-board satellite communications terminal and identity of the aircraft;
   a satellite constellation for receiving the transmitted terminal position data and the aircraft identity and retransmitting the terminal position data and the aircraft identity; and
   a ground network for:
   receiving the aircraft identity and the terminal position data;
   receiving real time flight related data from at least one data base, the real time flight related data comprises speed of the aircraft, altitude of the aircraft, status of the aircraft, flight distance, flight plan path and actual flight path;
   comparing the aircraft identity and the flight related data;
   calculating speed and heading based on the terminal position data; and
   storing and recording the terminal position data and the real time flight related data when an aircraft identification match is found at the ground based network and discarding the terminal position data when no aircraft identification match is found, wherein the system provides for an "always on" automatic real time tracking of the aircraft anywhere at all times.

2. The system of claim 1 wherein the ground network comprises:
   a lookup table for matching the received aircraft identity with another aircraft database.

3. The system of claim 1 wherein the satellite constellation is a satellite system constellation that includes an IP-based packet-switched communications network that provides a symmetric 'always-on' data connection of up to 432 kbit/s per channel.

4. The system of claim 1, wherein the flight related data further comprises: one or more of aircraft departure airport and aircraft arrival airport.

5. The system of claim 2 wherein the another aircraft database includes data from at least one of: a GPS (global position satellite), FAA (United States Federal Aviation Authority) and Canadian Aviation Authority.

6. The system of claim 4 wherein the set of instructions further comprises:
   a sub set of tracking instructions for viewing aircraft geographic position on a map.

7. The system of claim 1, further comprising:
   an interface to integrate automated real time aircraft tracking into one or more service offerings including flight operations management tools, in-flight mobile applications and for global flight tracking tools.

8. The system of claim 4 wherein the terminal position data is transmitted from an onboard aircraft avionics module using an IP-based packet-switched communications network that provides a symmetric 'always-on' data connection of up to 432 kbit/s per channel.

9. A method for aircraft positioning and automated real time aircraft tracking that provides an "always on" automatic real time tracking of the aircraft anywhere at all times, comprising the steps of:
   establishing an aircraft communication link between an aircraft and a satellite constellation;
   transmitting an aircraft position data of an on-board satellite communications terminal and aircraft identifier to the aircraft communication link from the aircraft to the satellite constellation;
   retransmitting the terminal position data and the aircraft identity to a ground based network;
   receiving the aircraft identity and the terminal position data at the ground based network;
   receiving real time flight related data from at least one data base at the ground based network, the real time flight related data comprises speed of the aircraft, altitude of the aircraft, status of the aircraft, flight distance, flight plan path and actual flight path;
   comparing the aircraft identifier and the flight related data at the ground based station;
   calculating speed and heading based on the terminal position data;
   storing and recording the terminal position data and the real time flight related data when an aircraft identification match is found at the ground based network;
   discarding the terminal position data when no aircraft identification match is found, wherein the method provides for an "always on" automatic real time tracking of the aircraft anywhere at all times.

10. The method of claim 9, further comprising the step of:
   automatically determining one or more of aircraft departure airport and aircraft arrival airport from the real time flight related data.

11. The method of claim 9, further comprising the step of:
   automatically mapping aircraft position.

12. The method of claim 9, further comprising the step of:
   determining a priority of the real time flight related data.

13. The method of claim 9, wherein the receiving of the real time flight related data comprises the step of
   receiving the flight related data from one of: a GPS (global position satellite), FAA (United States Federal Aviation Authority) and Canadian Aviation Authority.

14. The method of claim 9, further comprising the step of:
   communicating with avionics equipment on-board the identified aircraft to collect the aircraft terminal position data.

15. The method of claim 9, further comprising the step of:
   using a mobile application downloadable to a mobile communication device for accessing the automatic real time tracking of the aircraft anywhere at all times on a moving map.

16. The method of claim 9, wherein the step of establishing the communication link includes the step of:
   using an IP-based packet-switched communications network that provides a symmetric 'always-on' data connection of up to 432 kbit/s per channel.

\* \* \* \* \*